United States Patent
Nakanishi et al.

(10) Patent No.: US 10,629,924 B2
(45) Date of Patent: Apr. 21, 2020

(54) WATER-REPELLENT LAYER AND FUEL CELL

(71) Applicant: TOYOTA JIDOSHA KABUSHIKI KAISHA, Toyota-shi, Aichi-ken (JP)

(72) Inventors: Junji Nakanishi, Kasugai (JP); Hiroo Yoshikawa, Toyota (JP); Kenji Tsubosaka, Toyota (JP); Takeaki Saito, Toyota (JP)

(73) Assignee: Toyota Jidosha Kabushiki Kaisha, Toyota-shi, Aichi-ken (JP)

( * ) Notice: Subject to any disclaimer, the term of this patent is extended or adjusted under 35 U.S.C. 154(b) by 515 days.

(21) Appl. No.: 14/877,477

(22) Filed: Oct. 7, 2015

(65) Prior Publication Data

US 2016/0104905 A1   Apr. 14, 2016

(30) Foreign Application Priority Data

Oct. 14, 2014   (JP) ................. 2014-209770

(51) Int. Cl.
| | | |
|---|---|---|
| H01M 8/10 | (2016.01) | |
| H01M 8/04119 | (2016.01) | |
| H01M 8/1018 | (2016.01) | |

(52) U.S. Cl.
CPC ......... H01M 8/04119 (2013.01); *H01M 2008/1095* (2013.01)

(58) Field of Classification Search
CPC ......... H01M 8/04119; H01M 8/04156; H01M 8/0637; H01M 4/8657; H01M 4/9016; H01M 2004/8684; H01M 2004/8689; H01M 2008/1095; Y02E 60/566
See application file for complete search history.

(56) References Cited

U.S. PATENT DOCUMENTS

| | | | |
|---|---|---|---|
| 2009/0162721 A1* | 6/2009 | Naohara | H01M 4/881 429/444 |
| 2012/0225367 A1 | 9/2012 | Tsubosaka et al. | |
| 2013/0330649 A1 | 12/2013 | Takane et al. | |

FOREIGN PATENT DOCUMENTS

| | | |
|---|---|---|
| CN | 102668210 A | 9/2012 |
| JP | 2004-327074 | 11/2004 |
| JP | 2006-244782 | 9/2006 |
| JP | 2006-261004 A | 9/2006 |
| JP | 2007-213851 A | 8/2007 |
| JP | 2011-113860 | 6/2011 |
| JP | 2012-038479 A | 2/2012 |
| JP | 2012-79621 | 4/2012 |

* cited by examiner

*Primary Examiner* — Raymond Alejandro
(74) *Attorney, Agent, or Firm* — Finnegan, Henderson, Farabow, Garrett & Dunner, LLP

(57) ABSTRACT

A water-repellent layer for fuel cell contains a water-repellent material and a hydrogen peroxide decomposition catalyst. A mass ratio of the hydrogen peroxide decomposition catalyst to the water-repellent material is between 5 mass percent and 20 mass percent, inclusive.

2 Claims, 4 Drawing Sheets

| Sample No. | Mass of $CeO_2$ / Mass of PTFE [wt%] | Firing Temp[°C] |
|---|---|---|
| 1 | 6.7 | 340 |
| 2 | 13 | |
| 3 | 20 | |
| 4 | 27 | |
| 5 | 33 | |
| 6 | 10 | 290 |
| 7 | 20 | |
| 8 | 30 | |
| 9 | 40 | |
| 10 | 50 | |

WATER-REPELLENT LAYER AND FUEL CELL

CROSS REFERENCE TO RELATED APPLICATION

The present application claims priority to Japanese patent application No. 2014-209770 filed on Oct. 14, 2014, the entirety of disclosure of which is hereby incorporated by reference into this application.

BACKGROUND

The present invention relates to a water-repellent layer for fuel cell, and a fuel cell.

Hydrogen peroxide generated during operation of a fuel cell decomposes an electrolyte membrane and an ionomer of a catalyst layer. It is known that hydrogen peroxide is decomposed by addition of a cerium-containing oxide in an electrode (Japanese patent publication No. 2004-327074A). Another known technique for a fuel cell provides a cerium-containing layer on at least one surfaces of a membrane electrode assembly, in order to suppress reduction of the water content in the membrane electrode assembly. The cerium-containing layer is formed to contain a cerium-containing oxide of higher than 5 wt % but not higher than 30 wt % relative to 100 wt % of the solid content other than the cerium-containing oxide (Japanese patent publication No. 2011-113860A).

Employing a hydrogen peroxide decomposition catalyst such as cerium-containing oxide for a water-repellent layer, however, causes the following problem. The cerium-containing oxide is hardly soluble in water, so that there has been substantially no study on effect of cerium ion eluted from the cerium-containing oxide on the fuel cell. Cerium ion is, however, slightly eluted from the cerium-containing oxide in an acidic atmosphere in the electrode. The eluted cerium ion ($Ce^{3+}$) is adsorbed to the sulfonic acid group ($-SO_{3-}$) included in the electrolyte membrane and the ionomer of the catalyst layer to interfere with proton conduction. During the long time use of the fuel cell, adsorption of the cerium ion to the sulfonic acid group proceeds to cause reduction of the power generation performance of the fuel cell. The hydrogen peroxide decomposition catalyst is not limited to the cerium-containing oxide but may be a single element selected from an element group consisting of transition metal elements and rare earth metal elements and/or a compound including such a metal element. In the application using such a metal element or metal element-containing compound as the hydrogen peroxide decomposition catalyst, elution of the metal ion having positive charge from the hydrogen peroxide decomposition catalyst is adsorbed to the sulfonic acid group included in the electrolyte membrane and the ionomer of the catalyst layer to interfere with proton conduction. The less exposure of the hydrogen peroxide decomposition catalyst to water leads to the less elution of the metal ion. Using a water-repellent material suppresses exposure of the hydrogen peroxide decomposition catalyst to water and thereby suppresses elution of the metal ion from the hydrogen peroxide decomposition catalyst. In the case where the content of the hydrogen peroxide decomposition catalyst is excessive relative to the content of the water-repellent material, however, the water-repellent material is unlikely to sufficiently suppress exposure of the hydrogen peroxide decomposition catalyst to water.

In order to solve at least part of the above problems, the invention may be implemented by any of the following aspects.

SUMMARY

According to one aspect of the invention, a water-repellent layer used for a fuel cell is provided. The water-repellent layer contains a water-repellent material, and a hydrogen peroxide decomposition catalyst. A mass ratio of the hydrogen peroxide decomposition catalyst to the water-repellent material is between 5 mass percent and 20 mass percent, inclusive. In the water-repellent layer of this aspect, the mass ratio of the water-repellent material is increased to suppress exposure the hydrogen peroxide decomposition catalyst to water and thereby suppress elution of metal ion from the hydrogen peroxide decomposition catalyst. As a result, this suppresses adsorption of the metal ion eluted from the hydrogen peroxide decomposition catalyst to the sulfonic acid group included in an electrolyte membrane and an ionomer of a catalyst layer in the fuel cell and resulting interference with proton conduction.

In the water-repellent layer of the above aspect, the water-repellent material may be polytetrafluoroethylene, and the hydrogen peroxide decomposition catalyst may be a cerium-containing oxide. In the water-repellent layer of this aspect, the cerium-containing oxide decomposes hydrogen peroxide and suppresses decomposition of the electrolyte membrane and the ionomer.

According to another aspect of the invention, a fuel cell is provided. The fuel cell comprises an electrolyte membrane, catalyst layers that are formed on respective surfaces of the electrolyte membrane, and gas diffusion layers that are respectively placed on the catalyst layers. Each gas diffusion layer has the water-repellent layer of the above aspect on a catalyst layer-side. In the fuel cell of the above aspect, the mass ratio of the water-repellent material in the water-repellent layer is increased to suppress exposure the hydrogen peroxide decomposition catalyst to water and thereby suppress elution of metal ion from the hydrogen peroxide decomposition catalyst. As a result, this suppresses adsorption of the metal ion eluted from the hydrogen peroxide decomposition catalyst to the sulfonic acid group included in the electrolyte membrane and an ionomer of the catalyst layer in the fuel cell and resulting interference with proton conduction. Accordingly this suppresses reduction of the power generation efficiency.

In the fuel cell of the above aspect, a mass ratio of the hydrogen peroxide decomposition catalyst to the water-repellent material in a first water-repellent layer placed on an anode catalyst layer as one of the catalyst layers may be larger than a mass ratio of the hydrogen peroxide decomposition catalyst to the water-repellent material in a second water-repellent layer placed on a cathode catalyst layer as the other of the catalyst layers. The metal ion eluted from the hydrogen peroxide decomposition catalyst is transferred with water from the anode to the cathode, like proton, on as to decompose hydrogen peroxide. In the fuel cell of this aspect, the mass ratio of the hydrogen peroxide decomposition catalyst to the water-repellent material in the first water-repellent layer placed on the anode catalyst layer is set to be larger than the mass ratio of the hydrogen peroxide decomposition catalyst to the water-repellent material in the second water-repellent layer placed on the cathode catalyst layer. The metal ion eluted from the hydrogen peroxide decomposition catalyst is transferred from the anode to the cathode. Accordingly, even the small amount of the hydrogen peroxide decomposition catalyst sufficiently decomposes hydrogen peroxide and thereby suppresses decomposition of the electrolyte membrane and the ionomer.

The invention may be implemented by various aspects other than the water-repellent layer and the fuel cell including the water-repellent layer described above, for example, a method of manufacturing the water-repellent layer and a manufacturing method of the fuel cell including the water-repellent layer.

DESCRIPTION OF PREFERRED EMBODIMENTS

First Embodiment

Figure 1:
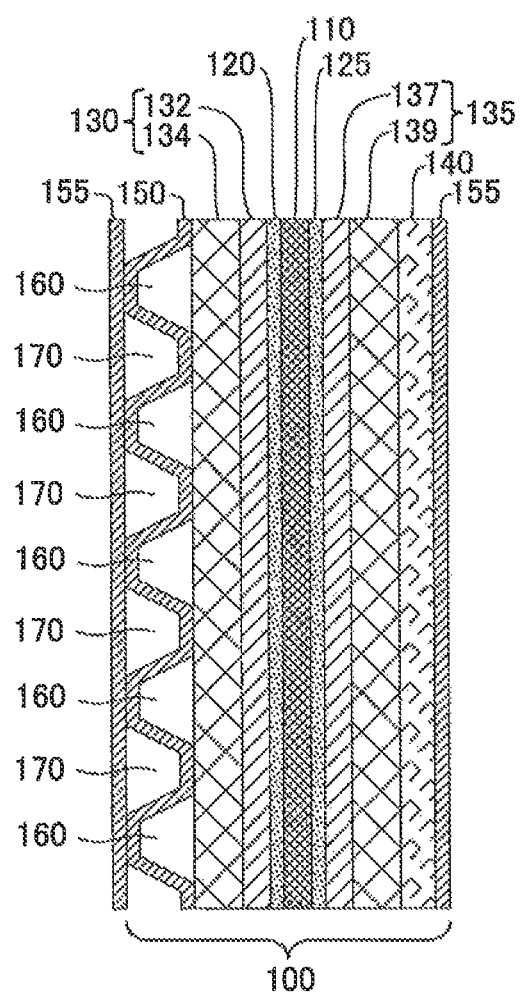
FIG. 1 is a diagram illustrating the configuration of a fuel cell according to a first embodiment.

FIG. 1 is a diagram illustrating the configuration of a fuel cell 100 according to a first embodiment. The fuel cell 100 includes an electrolyte membrane 110, an anode catalyst layer 120, a cathode catalyst layer 125, an anode gas diffusion layer 130, a cathode gas diffusion layer 135, a porous flow path layer 140, an anode-side separator 150 and a cathode-side separator 155. The electrolyte membrane 110 has proton conductivity and is made of, for example, a fluorine-based electrolyte resin (ion exchange resin) such as perfluorocarbon sulfonic acid polymer. The anode catalyst layer 120 and the cathode catalyst layer 125 are formed on the respective surfaces of the electrolyte membrane 110 and respectively include carbon with a catalyst (for example, platinum) supported thereon and a sulfonic acid group ($—SO_3H$)-containing ionomer. When there is no need to distinguish between the cathode and the anode, the anode catalyst layer 120 and the cathode catalyst layer 125 may simply be called catalyst layers 120, 125.

The anode gas diffusion layer 130 includes an anode microporous layer 132 (hereinafter referred to as "anode MPL 132") as a water-repellent layer, and an anode substrate layer 134. The anode gas diffusion layer 130 is arranged, such that the anode MPL 132 is located on the anode catalyst layer 120-side. The anode substrate layer 134 is made of carbon paper. Carbon unwoven fabric may be used, in place of carbon paper. The anode MPL 132 includes particulate carbon, polytetrafluoroethylene (PTFE) and cerium oxide ($CeO_2$).

The cathode gas diffusion layer 135 includes a cathode microporous layer 137 (hereinafter referred to as "cathode MPL 137") as a water-repellent layer, and a cathode substrate layer 139. The cathode gas diffusion layer 135 is arranged, such that the cathode MPL 137 is located on the cathode catalyst layer 125-side. The cathode substrate layer 139 is made of carbon paper. Carbon unwoven fabric may be used, in place of carbon paper. The cathode MPL 137 includes particulate carbon, polytetrafluoroethylene (PTFE) and cerium oxide ($CeO_2$) as a cerium-containing oxide.

PTFE included in the anode MPL 132 and in the cathode MPL 137 serves as the water-repellent material, and cerium oxide serves as hydrogen peroxide decomposition catalyst. This embodiment uses PTFE as the water-repellent material, but the water-repellent material used may be a fluororesin other than PTFE or any water-repellent material that does not contain fluorine. This embodiment uses cerium oxide as the hydrogen peroxide decomposition catalyst, but the hydrogen peroxide decomposition catalyst used may be a single element selected from an element group consisting of transition metal elements and rare earth metal elements and/or a compound including such a metal element. Specific examples include single elements such as Mn, Fe, Pt, Pd, Ni, Cr, Cu, Ce, Rb, Co, Ir, Ag, Au, Rh, Ti, Zr, Al, Hf, Ta, Nb and Os and compounds containing these elements.

The porous flow path layer 140 is located on the cathode gas diffusion layer 135. The porous flow path layer 140 is made of a porous metal material, for example, expanded metal. Lathe-cut metal may be used, in place of expanded metal. The porous flow path layer 140 is provided only on the cathode side according to this embodiment but may be provided additionally on the anode side. The cathode-side separator 155 is a plate-like member in a rectangular shape and is more specifically a flat plate without concavities and convexities. The anode-side separator 150 is, on the other hand, a plate-like member in a rectangular shape with concavities and convexities. The concaves on the surface or the rear face of the plate-like member form flow paths for the flow of anode gas and cooling water. More specifically, gas flow paths 160 for anode gas (hydrogen) are formed between the anode-side separator 150 and the anode gas diffusion layer 130, and cooling water flow paths 170 are formed between the anode-side separator 150 and the cathode-side separator 155.

Figures 2, 3:
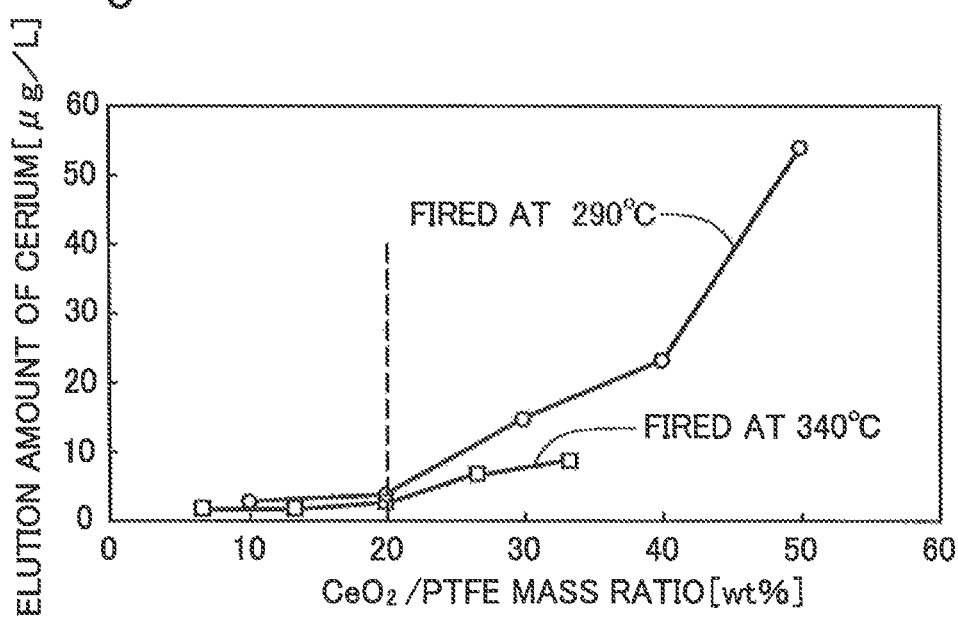
FIG. 2 is a table showing the mass ratio of cerium oxide ((mass of $CeO_2$)/(mass of PTFE)) and the firing temperature with regard to respective samples.
FIG. 3 is a graph showing the elution amount of cerium against the $CeO_2$/PTFE mass ratio with regard to the respective samples.

FIG. 2 is a table showing the mass ratio of cerium oxide ((mass of $CeO_2$)/(mass of PTFE)) and the firing temperature with regard to respective samples. Samples according to the first embodiment and samples of the comparative examples were produced as described below. The conditions employed were the same other than the mass ratio of the mass of cerium oxide to the mass of PTFE (mass percent (wt %)=(mass of $CeO_2$)/(mass of PTFE)×100, hereinafter referred to as "$CeO_4$PTFE mass ratio") and the firing temperature.

(1) MPL paste was produced by dispersing particulate carbon (DENKA BLACK (registered trademark) granular manufactured by DENKI KAGAKU KOGYO KAIBUSHIKI KAISHA), PTFE (PTFE dispersion AD911 manufactured by Asahi Glass Co., Ltd), and cerium oxide (cerium oxide S manufactured by TAIYO KOGYO CORPORATION) in water. The $CeO_2$/PTFE mass ratio herein denotes a value of this MPL paste. The mass ratio after firing is, however, assumed to be substantially the same.

(2) Carbon paper (manufactured by Toray Industries, Inc.) was soaked with PTFE and was fired to be water repellent.

(3) An MPL layer was formed by applying the MPL paste produced in (1) on the carbon paper treated to water repellent in (2), and was subsequently fired. This completed a gas diffusion layer.

FIG. 3 is a graph showing the elution amount of cerium against the $CeO_2$/PTFE mass ratio with regard to the respective samples. The graph has the $CeO_2$/PTFE mass ratio as abscissa and the elution amount of cerium as ordinate. The elution amount of cerium was obtained by soaking each sample in a sulfuric acid aqueous solution of pH 3 and 80°

C. and measuring the amount of cerium eluted into the sulfuric acid aqueous solution by ion chromatography.

As clearly shown in the graph of FIG. 3, the elution amount of cerium (or cerium ion $Ce^{3+}$) is stably low in a range of the $CeO_2$/PTFE mass ratio of not higher than 20 wt %, irrespective of the firing temperature of the MPL layer. The cerium ion is eluted by exposure of cerium oxide to acidic water. In the range of the $CeO_2$/PTFE mass ratio of not higher than 20 wt %, the mass of the hydrogen peroxide decomposition catalyst ($CeO_2$) is small relative to the mass of the water-repellent material (PTFE), so that PTFE as the water-repellent material effectively suppresses exposure of cerium oxide to acidic water. This decreases the elution amount of cerium ion from cerium oxide. Decreasing the elution amount of cerium ion results in decreasing the amount of cerium ion adsorbed to the sulfonic acid group in the electrolyte membrane 110 and the sulfonic acid group of the ionomer in the catalyst layers 120 and 125. Accordingly this suppresses reduction of the proton conductivity due to adsorption of cerium ion to the sulfonic acid group.

Figure 4:
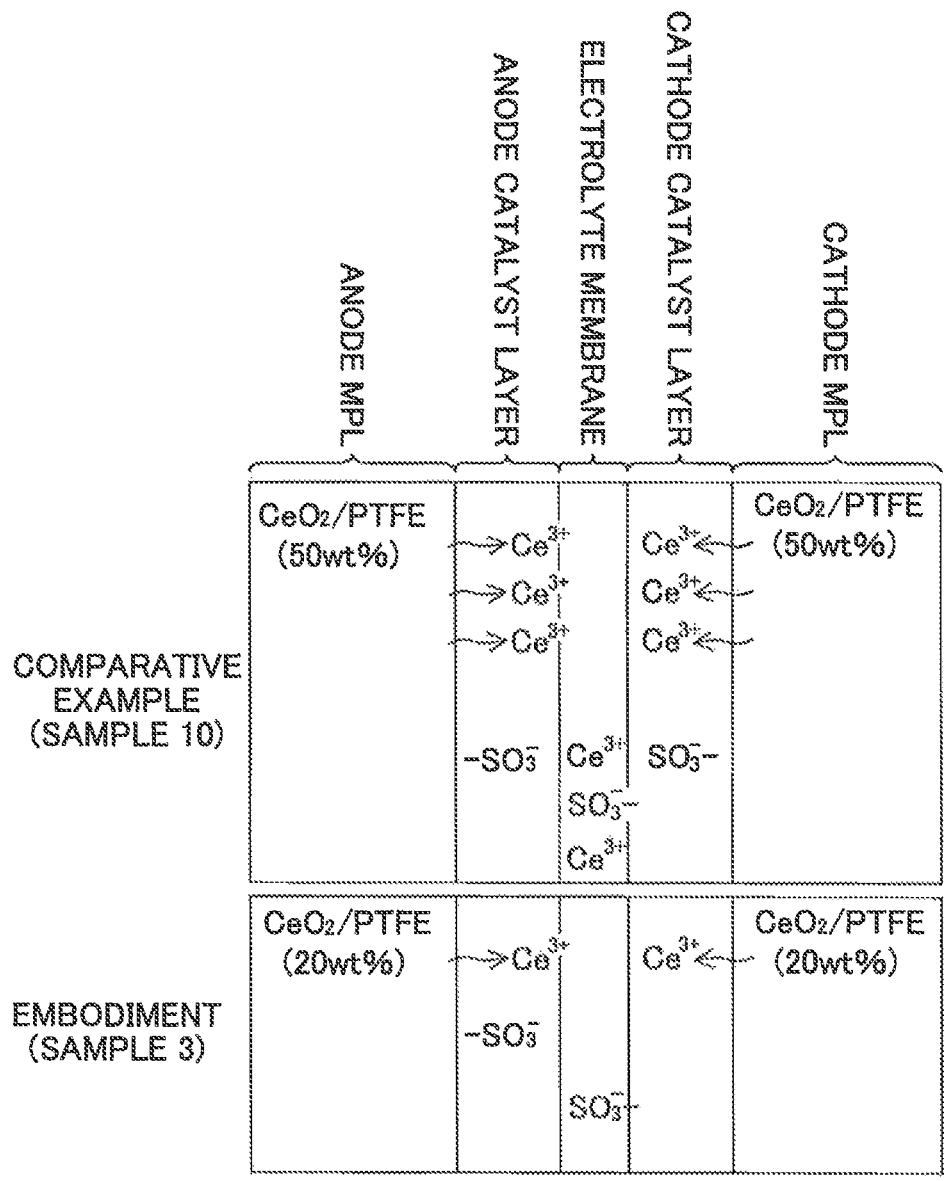
FIG. 4 is a diagram illustrating comparison in transfer of cerium ion between sample 3 (first embodiment) and sample 10 (comparative example)

FIG. 4 is a diagram illustrating comparison in transfer of cerium ion between sample 3 (first embodiment) and sample 10 (comparative example). The sample 10 (comparative example) has the $CeO_2$/PTFE mass ratio of as high as 50 wt %, so that PTFE as the water-repellent material fails to sufficiently suppress exposure of cerium oxide to acidic water. This causes a large amount of cerium ion to be eluted from cerium oxide. The eluted cerium ion is adsorbed by the sulfonic acid group ($-SO_{3-}$) in the electrolyte membrane 110 and in the catalyst layers 120 and 125 to interfere with proton conduction. The sample 3 (first embodiment), on the other hand, has the relatively low $CeO_2$/PTFE mass ratio of 20 wt %, so that PTFE as the water-repellent material succeeds in sufficiently suppressing exposure of cerium oxide to acidic water. This decreases the elution amount of cerium ion from cerium oxide. Decreasing the elution amount of cerium ion results in decreasing the amount of cerium ion adsorbed to the sulfonic acid group ($-SO_{3-}$) in the electrolyte membrane 110 and in the catalyst layers 120 and 125. Accordingly, the cerium ion hardly interferes with proton conduction.

As described above, controlling the $CeO_2$/PTFE mass ratio to be not higher than 20 wt % suppresses excessive elution of cerium ion from cerium oxide (hydrogen peroxide decomposition catalyst) and thereby suppresses reduction of the power generation performance. The $CeO_2$/PTFE mass ratio of not lower than 5 wt % allows for decomposition of hydrogen peroxide and suppresses an increase in cell resistance.

Second Embodiment

According to the first embodiment, the $CeO_2$/PTFE mass ratio in the anode MPL 132 is set to be identical with the $CeO_2$/PTFE mass ratio in the cathode MPL 137. According to a second embodiment, on the other hand, the $CeO_2$/PTFE mass ratio in the anode MPL 132 as a first water-repellent layer is set to be larger the $CeO_2$/PTFE mass ratio in the cathode MPL 137 as a second water-repellent layer. More specifically, the ratio of the mass of PTFE to the mass of cerium oxide is set to 20:4 ($CeO_2$/PTFE mass ratio of 20 wt %) in the anode MPL 132, and is set to 30:2 ($CeO_2$/PTFE mass ratio of 6.7 wt %) in the cathode MPL 137.

Cerium ion decomposes hydrogen peroxide and thereby suppresses decomposition of the electrolyte membrane and the ionomer by hydrogen peroxide. This cerium ion has positive charge and transfers from the anode to the cathode, like proton. Setting the $CeO_2$/PTFE mass ratio in the anode MPL 132 to be larger than the $CeO_2$/PTFE mass ratio in the cathode MPL 137 causes cerium ion eluted from the anode to be transferred to the cathode. This configuration allows for decomposition of hydrogen peroxide by the smaller amount of cerium.

Figure 5:
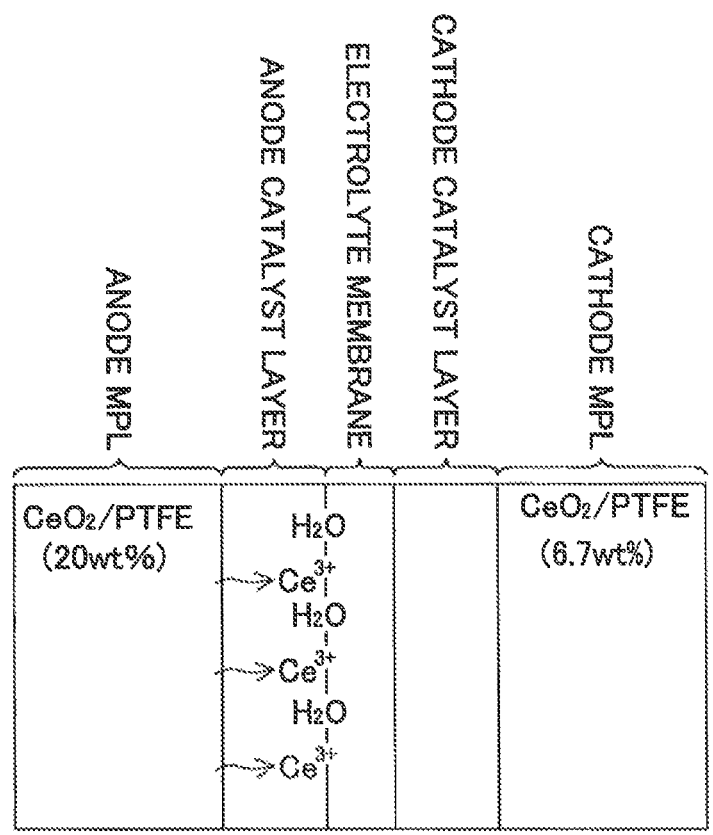
FIG. 5 is a diagram illustrating transfer of cerium ion according to a second embodiment.

FIG. 5 is a diagram illustrating transfer of cerium ion according to the second embodiment, the cathode has the $CeO_2$/PTFE mass ratio of as low as 6.7 wt % and thereby causes cerium ion to be hardly eluted. The anode, on the other hand, has the relatively high $CeO_2$/PTFE mass ratio of 20 wt % and thereby causes cerium ion to be eluted. Like proton, cerium ion is transferred with water toward the cathode and is penetrated into the electrolyte membrane and the cathode catalyst layer 125 to decompose hydrogen peroxide and suppress decomposition of the electrolyte membrane and the ionomer by hydrogen peroxide. As described above in the first embodiment, the $CeO_2$/PTFE mass ratio of not higher than 20 wt % causes elution of only a small amount of cerium ion. This decreases the amount of cerium ion adsorbed to the sulfonic acid group ($-SO_{3-}$) in the electrolyte membrane 110 and in the catalyst layers 120 and 125. Accordingly, the cerium ion hardly interferes with proton conduction.

The foregoing describes some aspects of the invention with reference to some embodiments and examples. The embodiments and the examples of the invention described above are provided only for the purpose of facilitating the understanding of the invention and not for the purpose of limiting the invention in any sense. The invention may be changed, modified and altered without departing from the scope of the invention and includes equivalents thereof.

What is claimed is:

1. A fuel cell, comprising:
   an electrolyte membrane made of a fluorine-based electrolyte resin;
   catalyst layers that are formed on respective surfaces of the electrolyte membrane; and
   gas diffusion layers that are respectively placed on the catalyst layers, each having a substrate layer and a water-repellent layer on a catalyst layer-side,
   wherein the substrate layer is made of carbon paper and
   wherein the water-repellent layer comprises
      particulate carbon,
      a water-repellent material, wherein the water-repellent material is polytetrafluoroethylene, and
      a hydrogen peroxide decomposition catalyst, wherein the hydrogen peroxide decomposition catalyst is a cerium-containing oxide,
      wherein a mass ratio of the hydrogen peroxide decomposition catalyst to the water-repellent material is between 6.7 mass percent and 20 mass percent, inclusive.

2. The fuel cell according to claim 1,
   wherein a mass ratio of the hydrogen peroxide decomposition catalyst to the water-repellent material in a first water-repellent layer placed on an anode catalyst layer as one of the catalyst layers is larger than a mass ratio of the hydrogen peroxide decomposition catalyst to the water-repellent material in a second water-repellent layer placed on a cathode catalyst layer as the other of the catalyst layers.

* * * * *